United States Patent
Dallarosa et al.

(10) Patent No.: US 9,636,776 B2
(45) Date of Patent: May 2, 2017

(54) LASER-BASED MARKING METHOD AND APPARATUS

(75) Inventors: Joseph Dallarosa, Worcester, MA (US); Andrey Nemera, Oxford, MA (US)

(73) Assignee: IPG Photonics Corporation, Oxford, MA (US)

( * ) Notice: Subject to any disclaimer, the term of this patent is extended or adjusted under 35 U.S.C. 154(b) by 722 days.

(21) Appl. No.: 14/070,908

(22) PCT Filed: May 2, 2011

(86) PCT No.: PCT/US2011/034778
§ 371 (c)(1),
(2), (4) Date: Nov. 4, 2013

(87) PCT Pub. No.: WO2012/150926
PCT Pub. Date: Nov. 8, 2012

(65) Prior Publication Data
US 2016/0158885 A1    Jun. 9, 2016

(51) Int. Cl.
*B23K 26/06* (2014.01)
*B29C 71/02* (2006.01)
(Continued)

(52) U.S. Cl.
CPC ...... *B23K 26/0619* (2015.10); *B23K 26/0006* (2013.01); *B23K 26/0066* (2013.01);
(Continued)

(58) Field of Classification Search
CPC ............ B23K 26/0006; B23K 26/0066; B23K 26/0619; B23K 26/0622; B23K 26/362;
(Continued)

(56) References Cited

U.S. PATENT DOCUMENTS 4,936,608 A * 6/1990 Gensel ............... B41M 1/28
                                                    283/70
5,612,251 A * 3/1997 Lee ............... H01L 21/2022
                                                    117/53
(Continued)

FOREIGN PATENT DOCUMENTS

DE      4234342 A1 *  4/1994
GB      2315445 A  *  2/1998
JP   2007-238438 A  *  9/2007

OTHER PUBLICATIONS

Machine translation of Japan Patent document No. 2007-238,438-A, Jun. 2016.*

*Primary Examiner* — Geoffrey S Evans
(74) *Attorney, Agent, or Firm* — Timothy J. King, Esq.; Yuri B. Kateshov, Esq.

(57) ABSTRACT

A method for marking a thin workpiece is designed to prevent deformation of the workpiece. A plurality of lasers are opposed to respective opposite sides of the workpiece so as to both sides are heat treated. The lasers can operate synchronously with the respective emitted beams aligned with one another. As a result, the workpiece does not exhibit signs of deformation upon the completion of the marking. The workpiece is made either from plastic or metals and has a thickness not exceeding 2 millimeters. The lasers each are configured as either a fiber laser or a gas laser. The marking can be performed by lasers which are configured uniformly or non-uniformly and includes annealing, engraving and ablating. The marking can be performed synchronously or sequentially. The multi-surface marking could also be used to cause "distortion of the surface in a more controlled or desired fashion.

11 Claims, 1 Drawing Sheet

(51) Int. Cl.

| | | |
|---|---|---|
| *B29C 71/04* | (2006.01) | |
| *B23K 26/00* | (2014.01) | |
| *C21D 11/00* | (2006.01) | |
| *C21D 1/09* | (2006.01) | |
| *C21D 1/34* | (2006.01) | |
| *B23K 26/362* | (2014.01) | |
| *B23K 26/0622* | (2014.01) | |
| *B29C 35/08* | (2006.01) | |
| *B23K 101/00* | (2006.01) | |
| *B23K 103/08* | (2006.01) | |
| *B23K 103/00* | (2006.01) | |
| *B23K 103/10* | (2006.01) | |
| *B23K 103/12* | (2006.01) | |
| *B23K 103/14* | (2006.01) | |

(52) U.S. Cl.
CPC ........ *B23K 26/0622* (2015.10); *B23K 26/362* (2013.01); *B29C 71/02* (2013.01); *B29C 71/04* (2013.01); *C21D 1/09* (2013.01); *C21D 1/34* (2013.01); *C21D 11/00* (2013.01); *B23K 2201/001* (2013.01); *B23K 2203/08* (2013.01); *B23K 2203/10* (2013.01); *B23K 2203/12* (2013.01); *B23K 2203/14* (2013.01); *B23K 2203/42* (2015.10); *B23K 2203/50* (2015.10); *B29C 2035/0838* (2013.01); *B29C 2071/022* (2013.01)

(58) Field of Classification Search
CPC .......... B23K 2203/08; B23K 2203/042; B23K 2203/50; B29C 2035/0838; B29C 2071/022; C21D 1/09; C21D 1/34; C21D 11/00

See application file for complete search history.

(56) References Cited

U.S. PATENT DOCUMENTS

| | | | | |
|---|---|---|---|---|
| 5,767,003 | A * | 6/1998 | Noguchi | H01L 21/2022 257/E21.133 |
| 6,208,458 | B1 * | 3/2001 | Galvanauskas | G02F 1/39 359/330 |
| 6,804,574 | B2 * | 10/2004 | Cheng | B41J 2/161 700/166 |
| 6,829,517 | B2 * | 12/2004 | Cheng | B23K 26/00 700/166 |
| 2005/0167403 | A1 * | 8/2005 | Petring | B23K 9/095 219/121.6 |
| 2006/0263698 | A1 * | 11/2006 | Mizuyama | G03F 1/144 430/5 |
| 2010/0284428 | A1 * | 11/2010 | Furuya | H01S 3/0675 372/6 |
| 2011/0017715 | A1 * | 1/2011 | Marcus | B23K 26/032 219/121.71 |

* cited by examiner

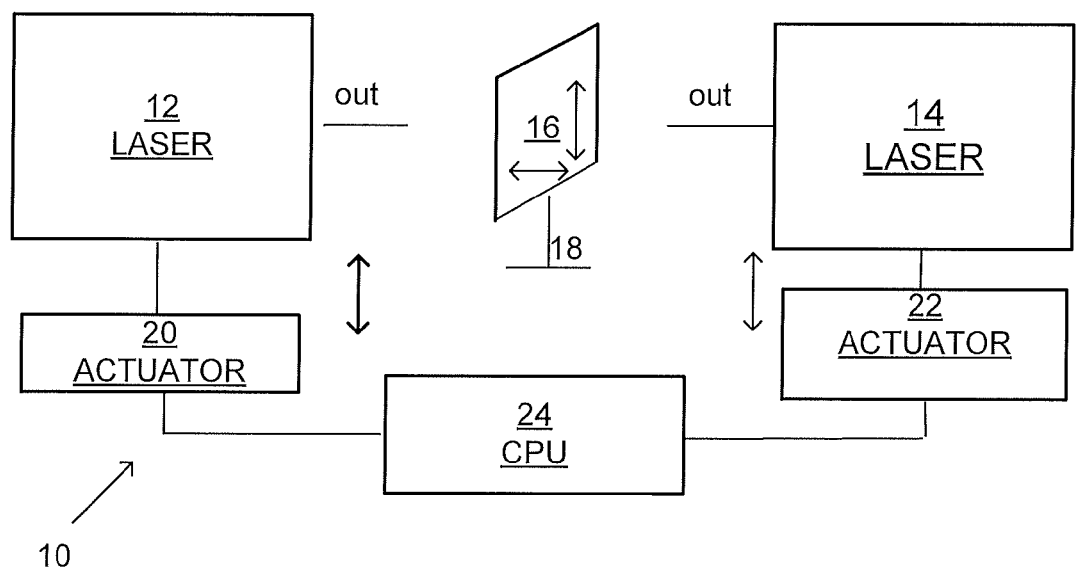

LASER-BASED MARKING METHOD AND APPARATUS

BACKGROUND OF THE DISCLOSURE

Field of the Disclosure

The disclosure relates to the laser-generated heat treatment of metal and plastic workpieces In particular, the disclosure relates to a laser-based method and laser system for marking thin metal and plastic sheets.

Prior Art

Marking in general is a widely used term including annealing, engraving and ablating techniques well known to one of ordinary skills in the art. Fiber laser annealing creates a permanent mark induced by heat without removing or compromising the material. (color marking actually causes oxide layers to form thus leading to a variety of colors in the marked material.)

The industrial market place has been in need for a way to easily mark metal and plastic with unique identifiers in a way that combines affordability and speed. This need is successfully met by lasers in general and fiber lasers in particular.

There are three primary laser technologies used for marking—fiber lasers, Nd:YAG and Nd:YVO4. While the wavelength from all three technologies is the same and varies around 1064 nm, the system characteristics and the resulting beams can differ in significant ways. One of the largest differences is in the maintenance required for the fiber laser which practically needs no significant maintenance.

It has been noted that marking thin metals, such as stainless steel, and plastics causes the deformation of the workpiece to be treated. For example, stainless steel is marked for a wide variety of purposes: marking of advertising materials, trophies as well as industrial uses. The latter often requires providing insignia associated with a given product or manufacturer on thin metal plates. When a workpiece is treated at high temperatures, it tends to deform. This of course is unacceptable for it destroys the aesthetic appeal of the marked product.

A need therefore exists for a viable laser-based marking process that at least minimizes and preferably completely eliminates deformation of thin metals and plastics.

A further need exists for a laser system operative to carry out the disclosed process.

SUMMARY OF THE DISCLOSURE

These needs are satisfied by the disclosed process and apparatus. In particular, the disclosure teaches heating the opposite sides of the workpiece to be treated while marking one of the heated sides. The experiments revealed that thin workpieces made from metal and plastic treated in accordance with the disclosed method do not have signs of visible deformation.

Accordingly, the disclosed method provides for determining an area designated for a mark on one side of workpiece. Then, two lasers are aligned with one another while facing respective one and other sides of the workpiece. Finally, while one laser takes part in forming the mark on the one, face side, the other laser irradiates the region on the other, back side of the workpiece across from the scannable area on the one side.

The disclosed laser system used to carry out the disclosed method includes variously configured X-Y plotter type mechanisms supporting two lasers. The workpiece to be treated is mounted between the lasers. Either the lasers are displaceable relative to one another and to the metal plate or, conversely, the plate is displaceable relative to the aligned lasers to the desired position or all aligned lasers and workpiece are displaceable relative to one another. The system is further configured with a controller operative to monitor and regulate parameters of the process and manipulate the mechanisms so as to produce the desired mark without the deformation of the workpiece.

BRIEF DESCRIPTION OF THE DRAWINGS

The above and pother features and advantages of the disclosed method and structure will become readily apparent from the following description accompanied by the following drawings, in which:

Sole figure is a diagrammatic view of an exemplary laser-based marking system configured in accordance with the present disclosure.

SPECIFIC DESCRIPTION

FIG. 1 illustrates a diagrammatic view of an exemplary system 10 including two laser systems 12 and 14, respectively. Preferably the lasers are configured as fiber lasers, but other laser configurations such as gas lasers can carry out the disclosed method. The configuration of the lasers is preferably uniform, but the scope of the disclosure includes different configuration provided the conditions disclosed below are met.

A mount 18 is located between lasers 12 and 14, respectively, along a light path and can have a variety of configurations each functioning as a support for a thin monolithic workpiece 16 made from plastic or metal. While system 10 is illustrated as functioning in a horizontal plane, other configurations are obvious choice of design. For example, lasers 12 and 14 may be positioned in a vertical plane relative to one another. The workpiece 16 may have limitless shapes and forms all having in a common a thickness ranging between tens and even hundreds of a millimeter and no more than about 2 mm. As practice shows, metal workpieces thicker than 2 mm typically do not deform during marking. The workpiece 16, if made from metal, may include among others, Titanium, Aluminum, Brass, Copper, and carbon-containing metals.

The market often requires color marking of metals, such as stainless steel. The marking of the latter is associated with a surface oxidation phenomenon. Annealing is usually conducted at a scanning speed slower than, for example, engraving. The slower the speed, the greater the heat absorbed by workpiece 16. Typically, when dark color marking is required, the temperatures are generally higher than for light color marking. However, workpiece 16 experiences high thermal stresses with elevated temperatures which may cause the deformation of workpiece 16.

In accordance with disclosure, the deformation is minimized by heating the opposite sides of workpiece 16. As known, most important parameters in laser marking, among others, are the focal spot diameter, power on workpiece, marking speed, line spacing, repetition rate, marking direction and pulse length if pulsed laser is utilized. All of the above-listed and other parameters are empirically and theoretically gathered and stored in a central processing unit ("CPU") 24.

The heat-treatment of opposite sides of a plastic workpiece is known from U.S. Pat. No. 7,763,179. However, in contrast to the disclosure, the prior art does not address the problem of the deformation of thin workpieces and teaches engraving opposite sides of plastic ID card with different patterns.

In accordance with one configuration of system 10, lasers 12, 14 respectively, operate synchronously. The lasers, if uniformly configured, are located relative to workpiece 16 at a uniform focal distance, have the same power, same scanning pattern with uniform marking speed and uniform repetition rate and pulse length. The lasers 12 and 14 may have respective actuators 20 and 22 primarily responsible for the distance between workpiece 16 and each laser, but if desired can be displaced in an XY plane. The mount 18 may also have several degrees of freedom in the XY plane.

Preferably, both lasers are single mode Yb fiber lasers each provided with a simple beam homogenizer modifying a Gaussian beam into a top hat beam. Alternatively, lasers 12 and 14 may be based on active fiber, such as Yb, with a core supporting multiple modes. Furthermore, the lasers may operate in CW or pulsed regime.

Alternatively, one of lasers 12 and 14 may start operating either before or after the other laser. Preferably the asynchronous operation of lasers is conducted before workpiece 16 is cooled to ambient temperatures. The laser may be differently configured, such as a fiber laser and a solid state laser, gas laser, and have the like parameters differing from one another. It is possible to utilize a combination of different types of lasers for treating opposite sides of workpiece 16.

The beam delivery may be designed in two well-known ways. The first technique is achieved by moving a set of mirrors and lens that are attached to an X-Y plotter machine. This technique is called a "flying optics" system because the mirrors and focus lens are moving in 2-dimensional space. The other technique uses a set of galvanometers and is referred to as a "galvo" system. The galvanometers are positioned at a 90 degree angle relative one another with a mirror affixed to each galvanometer. The laser beam is directed into the galvo-assembly, where it reflects consecutively from first and second mirrors, and then exits through the focusing lens (if any) so as to be incident onto the workpiece at a 90° angle relative to the input beam. By rotating mirrors in galvo-assembly, the output laser beam is positioned in X-Y plane on the workpiece.

The foregoing description and examples have been set forth merely to illustrate the disclosure and are not intended to be limiting. Accordingly, disclosure should be construed broadly to include all variation within the scope of the appended claims.

The invention claimed is:

1. A method for thermally treating a workpiece, comprising
energizing a first fiber laser which emits a first laser beam, thereby marking a predetermined area of a face side of the workpiece by the first laser beam; and
energizing a second fiber laser generating a second laser beam heating an area of a backside of the workpiece across the predetermined area on the backside; wherein the first and second fiber lasers operate to treat the workpiece, which is made from material selected from metal or plastic and has a thickness of up to about two millimeters, so as to create a permanent mark on the workpiece without removing the material while minimizing a deformation of the workpiece.

2. The method of claim 1, wherein the marking and heating of respective face and back sides are provided simultaneously by respective first and second laser-generated beams which are aligned.

3. The method of claim 1, wherein the marking and heating are sequentially conducted.

4. The method of clam 1, wherein the first and second fiber lasers each are selected from the group consisting of CW and pulsed lasers, the first and second fiber lasers providing marking and heating, respectively, being uniformly configured or non-uniformly configured.

5. The method of clam 1 further comprising controlling a laser parameter selected from the group consisting of a focal spot diameter, power on workpiece, marking speed, line spacing, repetition rate, marking direction and pulse length, and a combination thereof.

6. A laser system for thermal treating a workpiece, comprising:
a mount configured to support the workpiece with a thickness of up to 2 mm and made from metal or plastic;
first and second fiber lasers opposing respective face and back sides of the workpiece and operative to emit respective beams so as to mark the workpiece without removal of material and substantial deformation of the workpiece during heat treatment.

7. The laser system of claim 6, wherein the first and second fiber lasers, heating the face and back sides of the workpiece, respectively, each are selected from the group consisting of CW and pulsed lasers.

8. The laser system of claim 6 further comprising a controller coupled to the plurality of lasers.

9. The laser system of claim 8, wherein the controller is operative to energize the plurality of lasers simultaneously with one another so that the lasers operate synchronously and emit respective beams aligned to one another.

10. The laser system of claim 8, wherein the controller is operative to energize the plurality of lasers simultaneously with one another so that the lasers operate asynchronously.

11. The laser system of claim 8, wherein the controller is operative to monitor a laser operation by controlling a laser parameters which is selected from the group consisting of a focal spot diameter, power on workpiece, marking speed, line spacing, repetition rate, marking direction and pulse length, and a combination thereof.

* * * * *